Sept. 16, 1941.  N. J. OMAN  2,255,804
FEEDBACK WAVE TRANSLATING SYSTEM
Filed July 14, 1937   4 Sheets-Sheet 1

Inventor
Nils J. Oman
Attorney

Patented Sept. 16, 1941

2,255,804

UNITED STATES PATENT OFFICE 2,255,804

FEEDBACK WAVE TRANSLATING SYSTEM

Nils J. Oman, Haddon Heights, N. J., assignor to Radio Corporation of America, a corporation of Delaware Application July 14, 1937, Serial No. 153,574

13 Claims. (Cl. 179—171)

My invention relates to feedback wave translating systems and more particularly to negative feedback circuits in electric wave transmission amplifiers.

It has been well recognized that with the present day thermionic discharge amplifiers designed for handling large power output, the tendency to distortion, as well as hum or other noise interference from the power supply energizing circuits, has greatly increased. Several negative or degenerative feedback arrangements have been developed for reducing this difficulty but there has still remained certain disadvantages to be overcome, e. g., objectionable phase shift at certain frequencies, undue complication of circuit apparatus and general instability or unreliability over an extended frequency range.

Heretofore a certain type of amplifier has been known for its desirable characteristic of high power output with high operating efficiency and long life of tubes, but its use in any but modified forms has been prohibited, particularly in high fidelity transmission systems, because of inherently serious distortion.

It is therefore an object of my invention to increase the distortionless amplification of electric wave transmission systems.

It is another object of my invention to provide a new and improved distortion correcting network for a high power, highly efficient, modulation amplifier adapted to high level modulation of a radio frequency amplifier in a transmitting system.

It is a further object of my invention to provide a system making it possible to use a class B audio amplifier biased to plate current cut-off for high operating efficiency without the usual attendant bad distortion.

It is another object of my invention to provide a new and simplified negative feedback circuit for space discharge amplifiers that shall cause the latter to be substantially free of distortion and power supply circuit hum or noise over the operating range.

It is another object of my invention to provide an improved high gain negative feedback coupling circuit that is characterized by substantially constant attenuation and freedom from phase shift from zero to very high frequencies, e. g., several megacycles.

It is still another object of my invention to improve the operation of push-pull resistance coupled amplifiers in regard to maintaining equality of voltage on the two halves and with 180 degree phase relation, as well as to prevent longitudinal transmission of signals in the amplifier, in other words to preserve a balanced amplifier relation.

In accordance with one aspect of my invention, a portion of the voltage from the output stage of an audio amplifier, coupled by phase correcting networks, is fed back into a preceding stage in such manner as to obtain substantially constant attenuation and freedom from phase shift from zero to several megacycles, providing a full equalized feedback system. For this purpose I have provided a frequency or phase compensated potential divider network across the output of a cascade amplifier, and direct current feedback connections, free of impedance elements, from points on the output potential divider network to the input circuits of the first stage. Since an even number of stages are used, the cross connection is employed. Ordinarily, an even number of resistance coupled stages would result in regenerative feedback but the cross connection produces degeneration. However, in general, the question as to whether an even or odd number of stages produces regeneration or degeneration depends on whether the loop has phase reversing elements other than the tubes.

One or more of the stages are resistance coupled and, particularly with a class B amplifier, final stage and the above cross connection, it is desirable to obtain coupling between halves of the push-pull resistance coupled tubes in order to maintain equal voltages with 180 degree phase relation. This coupling is obtained by means of a common cathode-to-ground resistor without the usual by-pass condenser. The use of this particular arrangement has the further advantage of reducing any tendency toward transmission longitudinally of a signal through the amplifier. By this means it is possible to use degenerative feedback over an even number of stages with the last stage using class B operation. Longitudinal transmission refers to the case where both sides of a push pull, or balanced circuit, vary in signal potential together or with in-phase operation, with respect to ground, as compared to opposed phase, or balanced operation, to ground.

In my negative feedback amplifier the distortion and noise or hum is reduced in proportion to the reduction in gain effected by the feedback. This means that the system is designed to have much greater amplification than normal and then it is reduced by the inverse feedback means, the amount of this excess gain depending upon the amount of reduction in noise and/or distortion that is required. Heretofore the amount of gain and usable feedback has been limited by too much total phase shift in the loop. I have effected a substantial improvement by eliminating phase shift in the feedback path.

I am aware that prior developments have been made in negative feedback systems, some with phase compensating circuits, reference being made to Nyquist 1,915,440, Barnes 1,994,457, Black 2,003,282 and 2,011,566 patents for a more complete understanding of the background of feedback compensation. Very early work on regenerative feedback in cascade D. C. coupled amplifiers was done by Hartley, Patent No. 1,218,650, March 13, 1917.

An important aspect of my invention is the production of a system using pure class B amplification with its attendant high efficiency of operation. Heretofore, a compromise has been used because of inherent distortion in pure class B operation. In class B work, each tube handles one half of the wave and functions only when the grid swings in a positive direction with respect to its bias position. See Colpitts 1,128,292 by way of historical interest in the early development of class B amplification. For true class B amplification, the tubes should draw no plate current in the absence of impressed signal. It has been found that such operation gives objectionable distortion because of a serious non-linear relation between the characteristics of the two tubes. In practice, class B, or class AB, amplifiers have necessarily been designed to draw an appreciable amount of plate current in order to obtain a substantial linear relation, so that the operation has partaken of class A amplifier functions. Reference is made to Barton Patent 2,084,180, June 15, 1937, for a more complete understanding of class B operation in its various forms. Reference is also made to Loughren Patent 1,699,110, January 15, 1929, on a species of class B, the grid circuit of which has more in common with the present class B amplifier. While this residual or no load plate current is allowable in radio receiving sets, small amplifiers and the like, it becomes a serious power loss in high power radio transmitting systems. By means of my feedback system I have been able to use substantially pure class B amplification characterized by negligible no-load plate current, but without the attendant distortion.

Other objects and aspects of my invention will be apparent from the following description and claims.

In the accompanying drawings.

The modulator amplifier, built in accordance with my invention, differs from that usually employed for high level modulation of a high power transmitter in several respects:

(1) It makes use of inverse feedback from the plates of class B modulator tubes to the grids of the first audio tubes.

(2) The feedback connection is unique in that it can be made to have negligible phase and frequency characteristic from zero to extremely high frequencies.

(3) The feedback is coupled over an even number of stages from the plate of each modulator tube to the diagonally opposite grid of each input tube taking advantage of the 180 degree voltage relation between the two sides of the push-pull circuit.

(4) This practice places the feedback voltage in a channel terminating in a modulator grid that is biased beyond cut-off by virtue of class B operation of the final or modulator stage. It is therefore necessary to provide coupling means between the halves of the push-pull circuit to ensure operation of the feedback principle. This coupling is obtained through the use of unbypassed common cathode resistors in the first three stages of the amplifier. This method of coupling is substantially free of frequency characteristic or phase shift over the frequency range necessary for satisfactory operation of the feedback circuit of the modulator.

(5) Simplified and effective means for controlling phase and gain or voltage amplification around the feedback loop are incorporated in the design of the amplifier.

(6) A transformer is used to couple the driver tubes to the grids of the class B stage. The use of a few additional circuit elements external to the transformer have made it possible to realize transformer action over the audio spectrum and eliminate the adverse phase shift characteristic of transformers at higher frequencies.

Figures 1, 2:
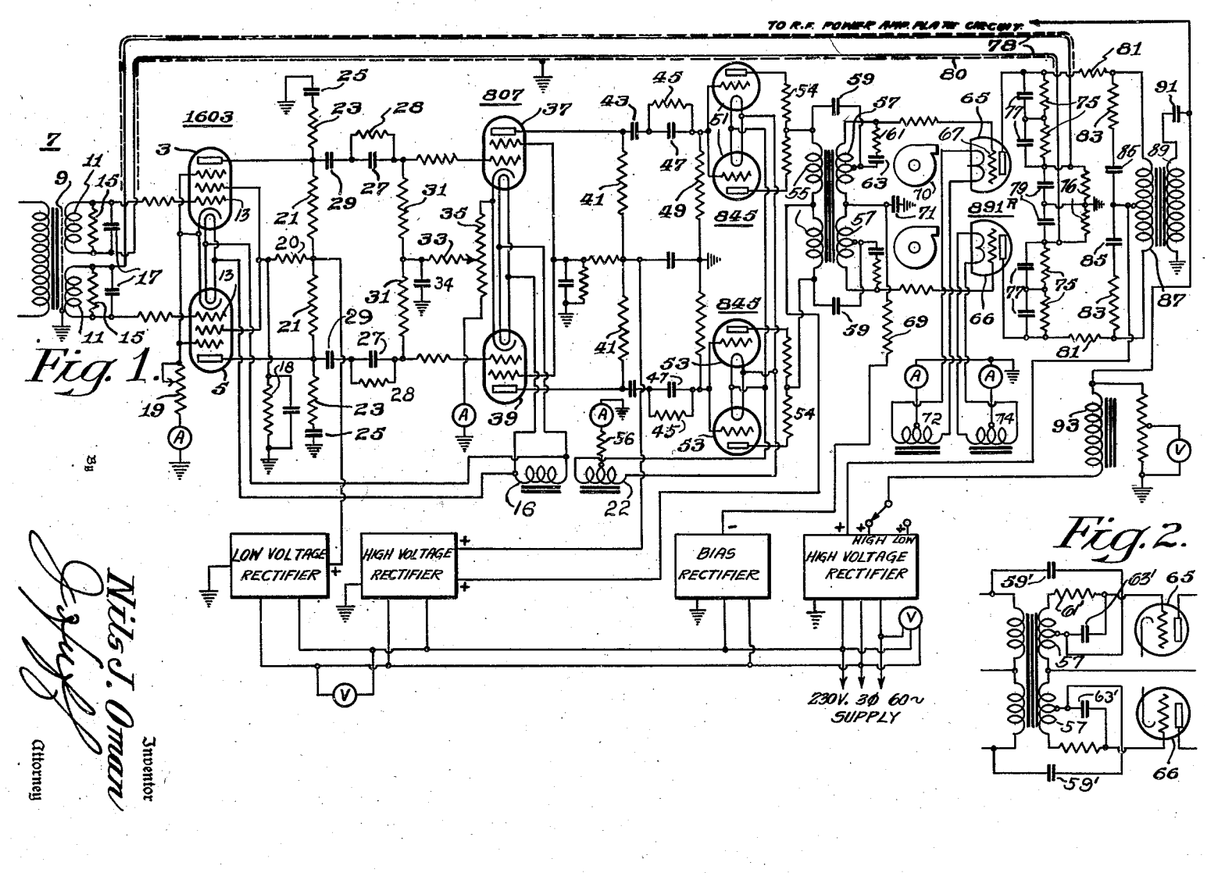
Figure 1 is a schematic diagram of the circuit of a modulating amplifier embodying my invention.
Figure 2 shows a circuit diagram of a modification of a portion of the system in Fig. 1, also made in accordance with my invention, and is preferable to the said portion of Fig. 1, Figures 3 and 4 are simplified diagrams of a portion of the system of Fig. 1 used to analyze an aspect of my invention.

Referring to Fig. 1, showing the circuit of a high level modulating amplifier system for a high power broadcast transmitter designed and built in accordance with my invention, a pair of class A push-pull screen grid indirectly heated cathode tubes 3 and 5 (type RCA–1603) are connected to a source of audio frequency signals by means of a push-pull transformer 7. The transformer is provided with the usual iron core and has a grounded shield 9 between windings. The secondaries 11 of the transformer are connected to grids 13 and each winding is shunted by a resistor 15 and a condenser 17. The grids are biased by means of a tapped or adjustable resistor 19, of a value large enough to supply the required operating bias, say two volts negative, and additional voltage to compensate for positive bias, of the order of twenty volts, fed back from the voltage divider 75—76, hereinafter described.

The anodes of the tubes 3 and 5 are supplied with direct current operating voltage, from a rectified A. C. source, through resistors 21, which serve as part of the coupling network to the next stage. A resistor 23 in series with condenser 25 connected from each anode to ground forms a high frequency phase correcting network, more fully hereinafter described.

The output of stage 1603 is coupled through stopping capacitors 29, and leak resistors 31, to the input or control grids of push-pull amplifiers 37 and 39 (type RCA-807), screen grid indirectly heated cathode tubes. Low frequency phase correcting elements consisting of resistors 28 and condensers 27, in mutual shunt relation, are connected in series between the anodes of the 1603 stage and the grids of stage 807. The cathodes are connected to ground through a resistor 35 that is effectively unbypassed to provide coupling between halves of the push-pull for reasons elsewhere given. The correct amount of operating bias voltage for the grids is taken from a portion of the bias and coupling resistor 35, through filter resistor 33 and leak resistors 31. Resistor 35 provides a greater amount of resistance than is required for bias for coupling both halves, a large coupling resistance being desirable. The low ends of resistors 31 are grounded for signals through condenser 34. The anodes of stage 807 are fed through output coupling resistors 41 from a high voltage rectified A. C. power supply, the screen grids being supplied as in stage 1603. The heaters for the cathodes are supplied with alternating current from a transformer secondary winding 16, the primary of which is not shown. It also energizes the cathode heaters of stage 1603.

The output of stage 807 is coupled to the input or signal grids of push-pull parallel connected amplifiers 51 and 53 (type RCA-845) triodes with directly heated cathodes, through stopping capacitors 43 and low frequency phase correcting networks including resistors 45 and 47 similar to those in the input of stage 807.

The cathodes are energized from the secondary winding 22 with raw alternating current. Grid bias is obtained through self bias resistor 56 in the cathode circuit between winding 22 and ground, the resistor being unbypassed for same reasons as given elsewhere in connection with resistors 19 and 35. The anodes are supplied from a high voltage rectified A. C. source through the primary windings 55 of a coupling transformer and parasitic suppressor resistors 54.

The stage 845 is coupled to the input or grids 67 of high power air cooled power amplifiers 65 and 66 (type RCA-891R) in driving relation therewith by means of a transformer having secondary windings 57, the ratio being 1 to 1.4 step up. High frequency phase correcting networks 59, 63 and 61 are connected to the transformer for reasons given below. The 891-R tubes are air cooled by means of blowers 70. The grids are negatively biased to about 1100 volts from the bias rectified A. C. source through a grid filter comprising resistor 69 and bypass condenser 71. The cathodes are fed by raw alternating current from separate windings 72 and 74 and the anodes are supplied with very high voltage of the order of 8500 volts from the rectified three phase source shown. The output audio frequency power from the anodes is used for high level modulation of the plate circuit of an RF power output amplifier, not shown. For this purpose, the anodes of tubes 65 and 66 are connected through resistors 75 to a primary 87 of an A. F. transformer, the secondary 89 of which is connected through a stopping condenser 91 to a modulating reactor 93 in series in the power supply lead to the plate of said R. F. power tube. As to one function of resistors 81, see Barton 2,023,506.

The feedback potential divider, described elsewhere, is connected from plate to plate of class B tubes 891R, the midpoint being grounded in balanced relation. It is desirable that resistors 81 be connected in the anode leads between the divider and the primary 87, across each half of which is connected frequency correcting networks, including condensers 85 and resistors 83 in series. Resistors 81 are parasitic surge prevention devices and preferably are non-inductive for use in combination with my feedback system.

The operating bias on the grids of the 891R tubes is preferably adjusted to an amount, of the order of 1100 volts, that the plate current is practically, but not entirely, cut off. While the tubes could operate biased beyond the region of zero plate current, it is preferable to operate them practically at cut-off in the present case. This point is determined by readings on ammeters A in the cathode return leads, and in order to be certain of this operating condition, the adjustments should be such that a small plate current flows, say 20 to 30 milliamperes, an amount that just moves the indicator slightly from zero.

Figure 9:
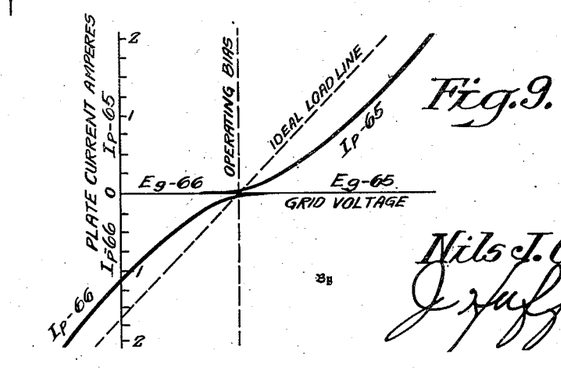
Figure 9 is a characteristic curve of substantially pure class B amplifier operation.

The curves in Fig. 9 represent the operation of tubes 65 and 66, although the curves were not taken by direct readings from the present system. The "operating bias" line corresponds to the 1100 volts bias used. The distance from the abscissa to the points of intersection of the bias line by either of the plate current $I_p$ curves represents the above residual plate current of around 25 mills. The extent to which the $I_p$ curves of the tubes 65 and 66 depart from the ideal load line represents serious distortion tendency. Now, if the conditions of operation were made such that the curves substantially follow this load line, as in Fig. 2 of Barton Patent 2,084,180, to minimize distortion, the intersections by the $I_p$ curves with the operating bias line would be quite a bit farther from the abscissa. Instead of 25 mills, the anodes would each draw about 350 mills of current for the condition of low distortion. This would mean a substantial waste of power in apparatus of the present kind. For both tubes, by way of example, twice 350 mills multiplied by 8500 volts equals 5,950 watts or 5.95 kw., this compared with only 500 watts as at present. In a transmitting system of 5 kw. rated output, this would mean that the total power consumption of the equipment would be 22 kw. instead of 16 kw., the power consumption of the present equipment. This saving is made possible by the feedback compensation in combination with the highly efficient class B amplifier operated at substantially zero plate current in the no-signal condition.

In the present system, I have employed a species of class B operation wherein no grid current flows, although it will be understood that the usual type involving the drawing of grid current over a part or all of the grid swing, or complete half cycle, may be used. The grids each swing from the 1100 volts bias as far as zero bias for maximum normal operation although the circuits are so designed that they will take care of even a larger swing, say to 300 volts positive, without drawing excessive grid current. The feedback circuit will compensate against the resulting tendency to distortion in such a case.

Regardless of the kind of grid circuit characteristics used, the more important feature is that my feedback circuit makes possible the zero signal, zero plate current class B operation. Furthermore, the feedback system removes the A. C. hum which would be prohibitive with the use of raw A. C. on the cathodes.

In order to assist those skilled in the art to practice my invention, I have given below desirable values for the various circuit elements. The values are merely illustrative of a particular modulating amplifier that has been designed and built, in accordance with my invention, for a 5 kw. air cooled, broadcast transmitter, 5D, and are not to be considered as limiting the invention. In the table, R stands for resistance in ohms and C for capacity in microfarads:

| Element | R | Element | C |
| --- | --- | --- | --- |
| 15 | 25,000 | 17 | .0002 |
| 19 | 700 | 25 | .0015 |
| 21 | 10,000 | 29 | 8 |
| 23 | 2,000 | 27 | .02 |
| 28 | 1 megohm | 43 | 8 |
| 31 | .39 megohm | 47 | 0.1 |
| 41 | 5,000 | 59 | 2.0 |
| 45 | 47,000 | 59' | 2.0 |
| 49 | 47,000 | 63 | .002 |
| 54 | 6 | 63' (Fig. 2) | .002 |
| 56 | 1,000 | 77 | .004 |
| 61 | 500 | (Ten capacitors #77 in each side) | |
| 61' (Fig. 2) | 2,000 | 79 | 0.1 |
| 75 | 2.2 megohm | 85 | .002 |
| (Ten resistors #75 in each side) | | | |
| 76 | 88,000 | | |
| 81 | 100 | | |
| 83 | 10,000 | | |

Referring to the feedback coupling circuit, the high A. C. voltages at the plate of each modulator tube 65 and 66 are reduced to a suitable value for introduction into the grid circuits of the first tubes 3 and 5 by means of resistance 75 and 76 capacity 77 and 79 voltage dividers with distributed constants. There is a separate divider for each modulator plate. Each divider has ground potential at its bottom end. At medium and high frequencies these units are capacity dividers. The values of capacities are so chosen that they will be large compared to any stray capacities that might affect the performance of the divider. The capacities must not be so large as to seriously affect the impedance of the load into which the modulator tube works. It is necessary to have control over the D. C. voltage applied to the grids of the first tubes of the amplifier. It is therefore necessary to parallel the lower sections of the dividers with resistors 76. These resistors would affect the performance of the divider at low frequencies; however, by placing resistances across all the capacities of the divider it is possible to make the voltage ratio of the resistance divider the same as that of the capacity divider. The system will then be independent of frequency. A portion of the D. C. modulator plate potential then appears on the grids of the first tubes. This voltage must be considered when choosing the value of the self bias resistor 19 for tubes 3 and 5, as above explained. The use of many series condensers for the upper arms of the voltage dividers reduces the heat to be dissipated by any one resistor and makes practical the use of small carbon units in parallel with each of these capacitors. While only two resistor capacity sections 75 and 77 are shown in the upper arm of each divider, in actual practice I have used ten sections.

The input transformer 7 used to couple the source of signal to the modulator is designed with two secondary windings 11 symmetrically placed so as to insure identical characteristics for each winding. The capacity from the grid end of each winding to ground is made as low as possible. An external capacity 17 is connected across each secondary winding. These capacities are made as large as possible without their having a serious effect on the frequency characteristic of the transformer. They must be large compared to the capacity from the grid end of each secondary to ground.

There are two reasons for keeping the capacity from the secondary grid connections to ground low in the input to stage 1603. First: at high frequencies this capacity will allow A. C. currents from the divider to flow through the secondary winding 11 to ground. The impedance of the winding 11 is not constant with frequency, and the variation of impedance would upset phase and amplitude of the feedback voltage. Second: the capacity from the grid connection to ground forms with the capacity across the secondary another voltage divider across the bottom section of the main dividers 76 and 79. If the capacity across the winding is large compared to the capacity from the grid connection to ground this undesired potential divider action will have little effect on the feedback voltage.

The capacity from the low side of each secondary winding 11 to shield 9 and ground is of no consequence as it may be included in the capacity 79 at the bottom of the voltage divider. Otherwise, this would cause bad phase shift, if the voltage divider were resistive.

The capacity of the leads 78 conducting the feedback voltage from the voltage divider tap to the low side of each secondary winding 11 may also be included in the capacity 79 of the bottom section of the voltage divider. Since the potential divider network is capacitive, and the lowest sections of large capacity, the capacity of the feedback conductors is but a small part of this capacity. It is possible to enclose the leads 78 in a grounded sheath 80 as of lead or other metallic cable shield. This prevents the pickup from extraneous fields, R. F. or high A. F., and capacity coupling to leads in other parts of the amplifier, which disturbances would cause singing or other trouble.

It is desirable that the leads between the two arms of each voltage divider be kept short. Long leads may have enough inductance to resonate with the large capacity 79 of the bottom section of the divider at some high frequency within the frequency range of interest for operation of the feedback circuit.

Referring to the phase and gain control features in the feedback loop, in order to have stability in a feedback amplifier it is necessary that the gain around the feedback loop should be less than unity when the feedback vector is in phase with the input voltage to the amplifier. When this in-phase condition exists, the amplifier is regenerative and the amplification of the system may rise. It is desirable to have the frequencies at which this condition occurs so far removed from the working frequency band that it will not adversely affect the operation of the amplifier over the transmission band of frequency required to modulate the transmitter.

It is also desirable to keep the feedback loop gain high over the transmission range of the amplifier and for a considerably higher range of frequencies so as to ensure reduction of harmonics generated in the amplifier that may fall above the required transmission range. In the present modulator amplifier these high frequency harmonics are further attenuated by the filter section formed by the modulation transformer 87—89 where cut-off occurs at 10 k. c.

In order to meet the frequency and gain requirements set forth in the previous discussion, it becomes necessary to design all circuits of the feedback loop to have a pass band much wider than that actually required for transmission of the modulation frequencies.

Figures 10, 11:
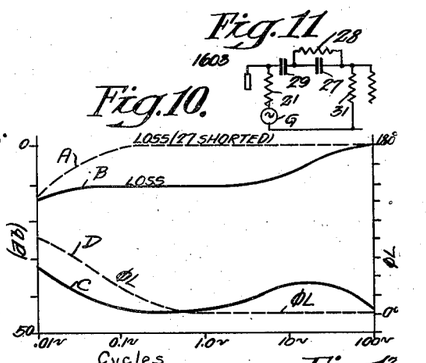
Figures 10, 10a, 12, 12a, 14, 14a, 16, 16a, 18, 18a and 19 are characteristic curves showing the characteristics of various portions of the system.
Figures 11, 11a, 13, 13a, 15, 15a, 17 and 17a are simplified diagrams illustrating circuits used in deriving the curves, the diagrams being shown immediately adjacent the curves pertaining thereto.
Figures 10A, 11A:
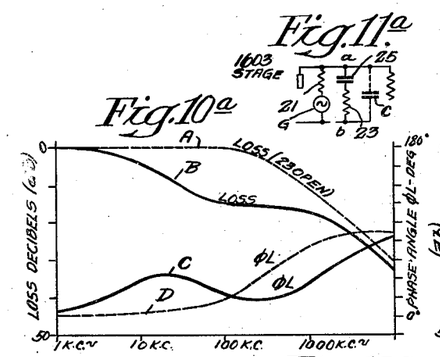

The dotted curves A and D of Fig. 10a show the performance of a resistance coupled stage, Fig. 11a, at high frequencies. It is apparent that considerable phase shift takes place before appreciable attenuation occurs. In this amplifier there are four such circuits. If they all could be made equally good, each would contribute an equal amount of attenuation at any frequency. If the amplifier were to utilize 30 db. of feedback it might be desirable to have 40 db. loss in loop gain when the accumulative phase shift becomes 180 degrees to ensure a margin of safety for stability. Each stage would then be required to contribute 10 db. loss at this frequency. This stage shown on Fig. 10a has a loss of 10 db. at 900 kc. The phase shift is 72 degrees. The total phase shift for a 40 db. loss with four of these circuits would be 4×72°=288°. This amplifier would not be stable with 30 db. feedback. The maximum phase shift per stage may not exceed $$\frac{180°}{4}=45°$$

This occurs at 300 kc. with a loss per circuit of only 3 db. Such an amplifier would be stable if the feedback did not exceed 12 db. This would not allow any margin of safety to take care of possible gain variation in the amplifier caused by changes in tubes and operating voltages, etc.

If the resistor 23 and condenser 25 shown connected between points a and b, Fig. 11a, is added to the circuit, the phase shift and loss will change to conform to the solid curves. From these curves it is obvious that it will be possible to obtain a loss in loop gain of 10 db. per stage with a phase shift of only 16 degrees at 250 kc. The loss would then be the required 40 db. with a total cumulative phase shift of only 4×16=64°. At the frequency of 45 degrees phase shift per circuit, the loss per circuit is more than 18 db., or a total loss of 72 db. Such an amplifier would have more than ample margin of safety for stability with 30 db. of feedback. Such an amplifier should be operative with 11 such high frequency circuits and have a limit of feedback of nearly 200 db., as governed by high frequency characteristics.

Figure 5:
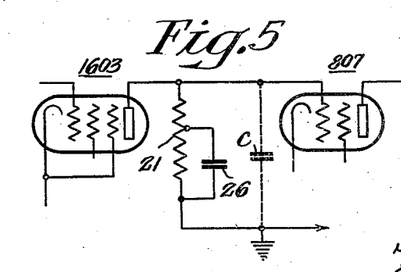
Figures 5, 7 and 8 are modifications of other features of my invention.

Results similar to those obtained with the circuit described on Fig. 11a may be obtained by having a tap on the 10,000 ohm resistor 21 and connecting a capacity 26 across a section of the resistor as shown in Fig. 5, element C representing input and output capacities of the tubes plus the distributed capacity to ground of the circuit elements.

Figures 12, 13:
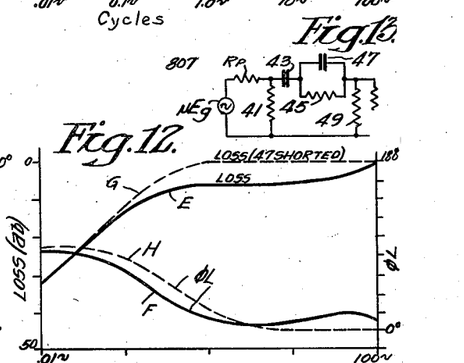
Figures 12A, 13A:
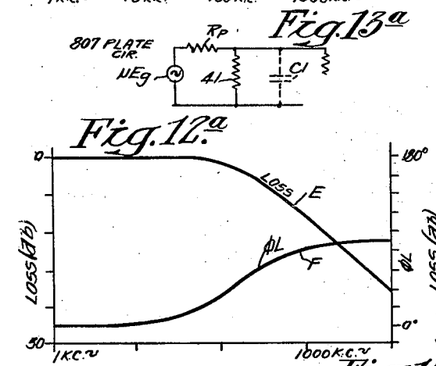

The 807 stage, Figs. 13 and 13a does not have any high frequency control circuits.

Figures 14, 14A, 15, 15A:
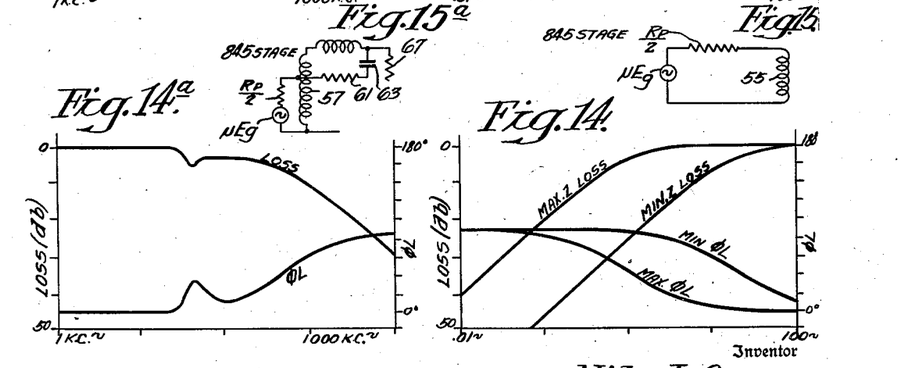

The 845 stage, see Figs. 15 and 15a uses a transformer to couple its plate circuit to the grids of the modulator tubes. This transformer has a primary winding 55 and a secondary winding 57, both balanced to ground in all respects. The secondary winding 57 has more turns than the primary, in the ratio of 1.4 to 1.0, but has taps so it is possible to obtain a 1 to 1 turn ratio from primary to secondary taps. Large condensers are connected from each end to the primary winding to the secondary tap of corresponding polarity and voltage, causing the transformer to be, in effect, an auto-transformer at high frequencies. The step-up section of the secondary winding is shunted by a resistance 61 and capacity 63 in series. The action of this circuit is somewhat similar to that of the high frequency circuit of Fig. 11a. Without this circuit the phase shift of the transformer would have a final limit of 270 degrees instead of 90 degrees and it would be impossible to meet requirements for stability with 30 db. of feedback.

Figure 6:
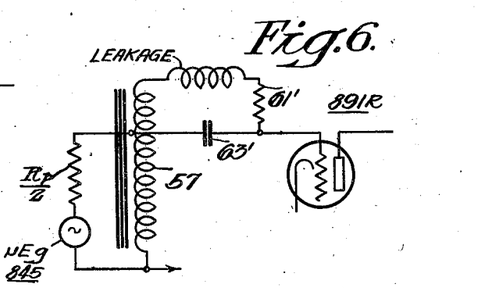
Figure 6 is a simplified explanatory diagram of circuit of Fig. 2 showing operation at high frequencies.

My computations have shown that the phase shift of a circuit as used to connect the driver transformer may be made less if the connections are as shown in Fig. 2, analyzed in Fig. 6. The circuit in Fig. 2 is an improvement over the corresponding portion in Fig. 1 in that there is provided a low impedance path around the transformer, i. e., from the plates of the 845 stage to the grids of the 891R stage, by means of the path directly through condensers 59' and 63'. The leakage reactance between the 1:1 sections is effectively shorted by condenser 63'. The modification in Fig. 2, while preferable to the corresponding portion in Fig. 1, is not shown there because of the desirability of making Fig. 1 correspond to the system actually used in the 5 kw. transmitter, type 5D.

Figure 16:
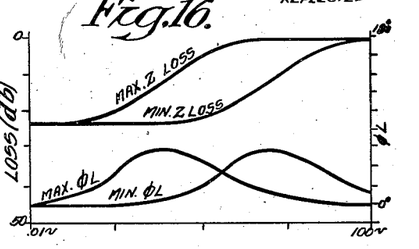
Figures 16A, 17A:
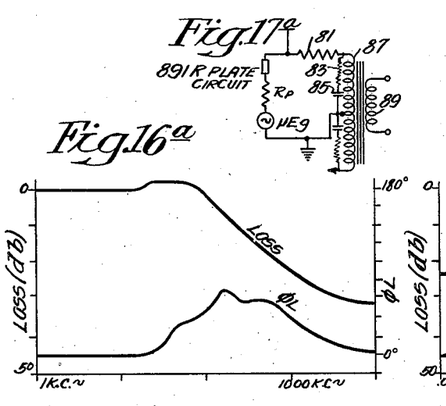
Figure 17:
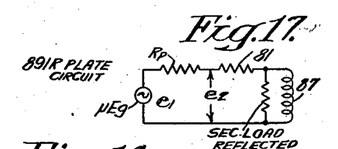

The final stage of the modulator may be represented as shown in Figs. 17 and 17a. The feedback voltage is taken off at the plate of the modulator tubes 65 and 66. The modulator load is fed through a 100 ohm resistance 81. The distributed capacity across the primary 87 would cause the phase shift of this stage to reach 90 degrees at less than 500 kilocycles. The 100 ohm resistor 81 limits this phase shift to 70 degrees and causes the phase shift at very high frequencies to return to nearly 0.

Figure 7:
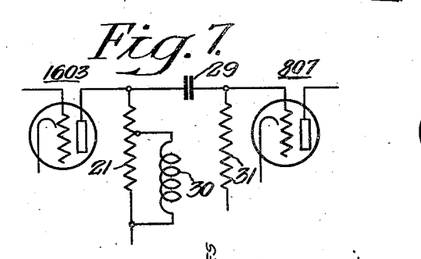
Figure 8:
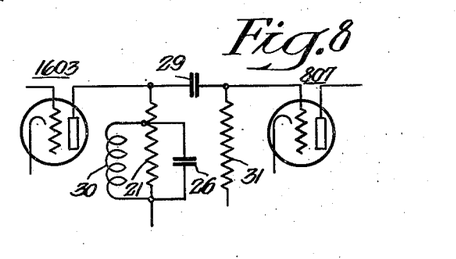

The performance of the low frequency phase control circuits used in the 807 and 1603 stages is illustrated by Figs. 12 and 10, respectively. The results of using these circuits are similar to those obtained with the high frequency circuit, Fig. 11a. A shunt inductance 30 on a portion of the plate resistor 21, as shown in Fig. 7, will perform in a similar manner. Fig. 8 shows the circuits of Figs. 5 and 7 combined for high and low frequency control in one circuit.

Fig. 14 shows the characteristics of the 845 stage at low frequencies. Two sets of curves show the limiting values of phase shift and attenuation, depending on primary inductance of the transformer which is a function of signal voltage.

Fig. 16 shows a similar set of curves for the modulator stage. The use of the 100 ohm resistors 81 limits the phase shift of this stage to a maximum of 60 degrees and causes the phase shift to return to 0 at a low frequency.

Figure 18:
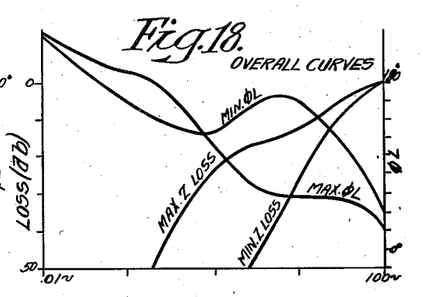

Fig. 18 is obtained by adding the phase shifts and losses of each of the 4 circuits to obtain the total for the modulator feedback loop at low frequencies.

Figure 18A:
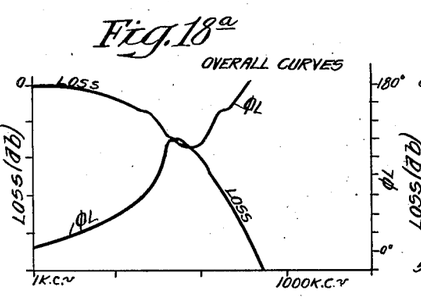

Fig. 18a shows the same for high frequencies.

Figure 19:
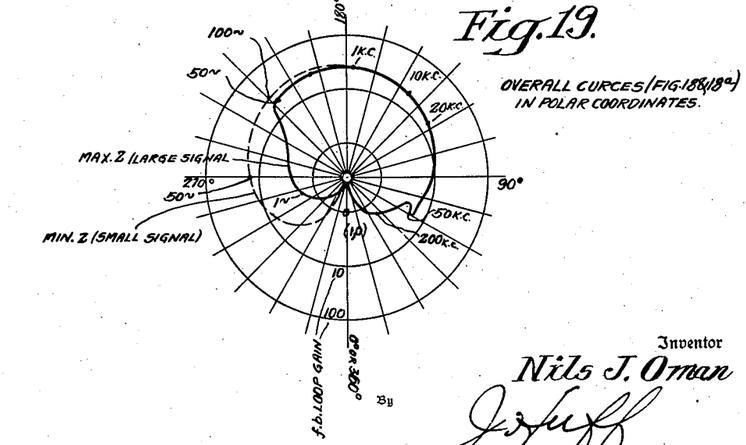

Fig. 19 gives the results of Fig. 18 and Fig. 18a in polar coordinates.

Figure 3:
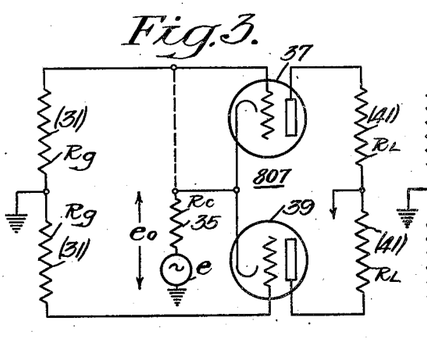

Referring to Fig. 3, I have shown a common cathode resistor method of obtaining coupling between halves of a push-pull resistance coupled circuit. It is desirable to have a substantially larger coupling resistor in the cathode circuit than is required for bias in order to properly couple both halves of the push-pull stage.

37 and 39 are two like tubes each having constants $\mu$ and $R_p$ (internal plate resistance).

Let the grid 37 be connected to its cathode.

Let a voltage $e$ be introduced in series with $R_c$.

A current will flow in $R_c$ causing a voltage to appear in series with $e$.

Let the sum of these voltages $= e_o$, that is, the voltage from cathode to ground.

$e_o = e + ER_c$ where $ER_c$ = induced voltage in $R_c$.

(I) $$ER_c = \frac{\mu e_o R_c}{R_c + R_p + R_L}$$

(II) $$e_o = e - \frac{\mu e_o R_c}{R_c + R_p + R_L}$$

(III) $$e = e_o\left[1 + \frac{\mu R_c}{R_c + R_p + R_L}\right] = e_o\left[\frac{R_c + R_p + R_L + \mu R_c}{R_c + R_p + R_L}\right]$$

(IV) $$e_o = e\left[\frac{R_c + R_p + R_L}{R_c + R_p + R_L + \mu R_c}\right]$$

Figure 4:
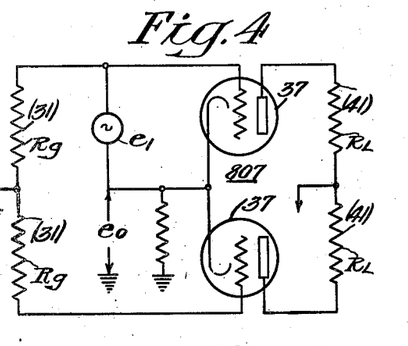

Referring to Fig. 4:

Now introduce a voltage $e_1$ from grid of 37 to cathode.

A voltage $\mu e_1$ will appear in the plate circuit of tube 37.

A part of this voltage corresponding to $e$ of the previous discussion will appear in $R_c$.

(V) $$e = \frac{R_c \mu e_1}{R_c + R_p + R_L}$$

This voltage will be altered by tube 39 to give (VI) $$e_o = \frac{R_c \mu e_1}{R_c + R_p + R_L} \times \frac{R_c + R_p + R_L}{R_c + R_p + R_L + \mu R_c} \quad \text{(IV)}$$

(VII) $$e_o = e_1 \frac{\mu R_c}{R_c + R_p + R_L + \mu R_c}$$

To have perfect push-pull voltage in the plate circuit load resistors $R_L$ and $R_c$ when a voltage is impressed from only one grid to ground $e_o$, must equal $e_1$ and from (VII)

$$\frac{\mu R_c}{R_c + R_p + R_L + \mu R_c} \text{ must} = 1$$

This is a condition that is impossible. However, if $R_c$ is made large, the value of the fraction can be made to approach 1.

In the first audio stage of the amplifier used in the modulator the coupling is approximately 80%. Another fact obvious from the above discussion is that the amplification of the stage is only one half for unbalance voltage because the input unbalance is divided nearly equally between grid to cathode and cathode to ground. This will result in a 6 db. loss in feedback at a frequency where no voltage is fed back from one modulator plate.

The modulation transformer furnishes excellent coupling between the halves of the circuit at low frequencies. At high frequencies it fails because of leakage reactance between halves of its primary. This loss of feedback will occur only at high frequencies. Inasmuch as the total feed back is 30 db. this is not serious.

From the foregoing it is apparent that I have provided an improved negative feedback amplifying system, characterized by high efficiency and stability of operation, high fidelity and freedom from hum and noise. While the system has particular utility as a modulating amplifier in a high power radio transmission system, it may be used as an amplifier for many other purposes where high fidelity and efficiency are required, e. g., public address and sound film amplifier systems. When used as a high level modulator in a 5 kw. broadcast transmitter, by way of example, it makes possible the following: a substantial yearly saving in cost of power; lower cost of tubes because of longer life resulting from pure class B operation; high fidelity over the entire audio frequency band (less than 3% R. M. S.) as distinguished from feedback systems heretofore used and tend to increase high frequency distortion; freedom from further adjustments of the negative feedback circuit after installation, even in case of a change in power from 1 to 5 kw. or the replacement of tubes; stable operation of amplifier although having 30 db. or more of degenerative feedback. Although the feedback acts from the anodes of the class B modulator tubes back to the audio input transformer, in a high level modulation system with which the audio amplifier is used, the feedback device will compensate for distortion and hum ripple occurring in the class C radio frequency amplifier portion of the transmitter, not shown, and also tends to compensate the modulating voltage of the class C stage.

While I have shown and described certain embodiments of my invention, it will, of course, be understood that I do not wish to be limited thereto, since modifications may be made in the circuits and apparatus employed without departing from the spirit and scope of my invention as set forth in the appended claims.

I claim as my invention:

1. In a negative feedback audio frequency amplifier, a plurality of amplifier devices, coupling means provided with phase correcting networks, means forming a feedback loop circuit with said amplifier devices and said coupling means for compensating against distortion, one of said coupling means comprising a transformer having other than unity ratio of turns between a pair of primary and secondary windings, a capacitor connected between a high potential terminal of the lower impedance winding to a tap on the higher impedance winding so that the turn ratio with respect to said tap is substantially unity, a resistor connected at one end to a high potential terminal of said secondary winding in series relation therewith, and a second capacitor connected between said tap and the other end of said resistor, whereby a low impedance path for high frequencies is provided around said transformer and series resistor.

2. In an electric wave transmission system having input and output circuits, a plurality of amplifier devices coupled in cascade for transmitting a wide band of audio frequencies, resistance capacity coupling means provided with phase correcting networks connected between a pair of said amplifier devices, transformer coupling means including a resistor capacity phase correcting network connected between another pair of said amplifier devices, and a degenerative feedback circuit characterized by absence of phase shifts connected between said output and input circuits, said circuit forming with said amplifier devices and coupling means a feedback loop that is equalized over a range from very low to very high frequencies substantially exceeding in extent said transmission band.

3. In an electric wave transmission system, a balanced input transformer having a primary and a pair of secondaries, a balanced amplifier having cathode, output and input electrodes connected to said secondaries, a second balanced amplifier, resistance coupling means between said amplifiers provided with phase correcting network, a third balanced amplifier coupled to the output of said second amplifier, transformer coupling means connected to the input electrodes of said third amplifier and provided with phase correcting networks, a frequency equalized potential divider connected between the output electrodes of said third amplifier and ground, said divider comprising a plurality of resistors connected in series and shunted by a plurality of capacitors, respectively, means forming a negative feedback loop comprising a pair of shielded conductors directly connected between potential points of said divider on either side of the ground potential point and the low potential ends of said input secondaries, respectively.

4. The invention as set forth in claim 3 wherein negative bias means is connected in circuit with said first balanced amplifier to supply operating bias for the input electrodes and to compensate against a substantial amount of positive bias introduced by said feedback conductor connections.

5. An electrical wave amplifying system comprising a cascade amplifier, input and output coupling means therefor, a frequency compensated potential divider network including capacity connected in parallel with said output coupling means and to ground, said output coupling means being connected to ground exclusively of said network, an inverse feedback connection substantially free of impedance elements and phase shift including a conductor connected from a low potential point on said divider network and a low potential side of said input coupling means, and a grounded shield for said conductor, the capacity between said conductor and shield being included in a portion of the capacity of said divider network.

6. An electrical wave amplifying system comprising first and last amplifiers in cascade, said amplifiers having input and output electrodes and input and output coupling means, respectively, a frequency compensated potential divider network connected in parallel with said output coupling means and to ground, said output coupling means being connected to ground exclusively of said divider network, said input coupling means being connected to an input electrode of said first amplifier, and a ground return path for said input coupling means including a low impedance connection from a low potential side of said input coupling means to a low potential point on said divider network.

7. An electrical wave amplifying system comprising a plurality of push-pull stages in cascade relation, balanced input and output coupling means for said system, a frequency compensated network connected in parallel with said output coupling means and to ground, said output coupling means being connected to ground exclusively of said network, and a pair of ground return paths for said input coupling means including low impedance connections from low potential sides of said input coupling means to points, respectively, on said divider network and through low potential portions of said network to ground.

8. An audio frequency amplifying system for a wide transmission band comprising input and output balanced circuits, an even number of balanced amplifier stages, one of said stages comprising a pair of electric discharge devices having its input resistance coupled in push-pull relation, resistance means common to said devices in a mid-branch for ensuring symmetry of push-pull operation, the last of said stages comprising a pair of electric discharge devices connected for class B operation, inductive coupling means in the input of said last stage, phase compensating networks connected in circuit with said inductive coupling means for minimizing phase shift at high frequencies, and a feedback connection from at least one side of the balanced output circuit to the opposite side of the input balanced circuit, forming a feedback loop which is equalized over a band of frequencies substantially exceeding in extent said transmission band.

9. An electrical wave amplifying system for a wide band of audio frequency signals comprising a plurality of electric discharge amplifier stages in cascade, at least one of said stages being push-pull resistance coupled, the amplifiers of said stages having input, output and cathode electrodes, balanced input and output coupling means for said system, degenerative feedback paths connected from both sides of said output to opposite sides of said input coupling means, respectively, and resistance means connected in a circuit common to both sides of said push-pull stage, said means having sufficient magnitude of resistance to currents of audio signal frequency in said band to maintain substantially equal signal voltages and 180 degree phase relation between both sides of said resistance coupled stage.

10. In an audio frequency amplifying system for a wide band of frequencies having input and output balanced circuits, a plurality of pairs of electric discharge devices connected in balanced cascade relation and having input, output and cathode electrodes, one of said pairs being resistance coupled in push-pull relation, resistance means connected in a path common to the cathode circuits of said resistance coupled pair for ensuring symmetry of push-pull action, a driving transformer having its secondary windings connected to input electrodes of a following pair of discharge devices, respectively, means affording high frequency paths connected between points on the primary and secondary windings of substantially equal points of signal voltage, respectively, for minimizing phase shift at high frequencies, and means forming a feedback loop connected between one side of said balanced output circuit and one side of said balanced input circuit including in said loop said transformer, said loop being equalized over a range from low to high frequencies substantially exceeding said band.

11. An audio frequency amplifying system for wide band signal transmission comprising balanced input and output circuits, a plurality of amplifier stages coupled in cascade relation including a stage arranged for class B operation, said stages including electric discharge devices having input, output and cathode electrodes, inductive coupling means connected to the input electrodes of said class B stage, a feedback circuit connected from at least one side of said balanced output circuit to the opposite side of said balanced input circuit and forming a loop including said stages, push-pull resistance coupling means connected to the input electrodes of a balanced amplifier stage preceding said class B stage, resistance means in a common branch circuit of said last named stage for preserving symmetrical push-pull operation and ensuring that the feedback signal voltages impressed on said input electrodes of said class B stage are symmetrical and opposite in nature.

12. The invention as set forth in claim 2, wherein said transformer coupling means has a ratio of transformation other than unity, and a path for high frequency currents connected between points of substantially equal potential on primary and secondary windings, respectively.

13. The invention as set forth in claim 2, wherein said transformer coupling means has a ratio of transformation and turns other than unity, a path for high frequency currents connected between points of substantially equal ratio of transformation, respectively, and a resistor capacitor circuit connected from one of said points to a high voltage point on one of said windings having the greater number of turns.

NILS J. OMAN.